United States Patent [15] 3,694,672

Buyak [45] Sept. 26, 1972

[54] TIMING CIRCUIT WITH MULTIPLE TIME CONSTANTS AND SWITCHING MEANS TO CONNECT AND DISCONNECT SAID TIME CONSTANTS SELECTIVELY

[72] Inventor: William P. Buyak, New Hartford, Conn.

[73] Assignee: North American Philips Corporation, New York, N.Y.

[22] Filed: March 23, 1971

[21] Appl. No.: 127,275

[52] U.S. Cl. ..................307/293, 307/228, 307/246, 307/283, 307/301, 331/111

[51] Int. Cl. ............................H03k 4/50, H03k 5/13

[58] Field of Search......307/228, 246, 283, 293, 301; 328/185; 331/111

[56] References Cited

UNITED STATES PATENTS 3,486,044 12/1969 Hirsch ...................307/301 X 3,105,160 9/1963 Adler.....................307/294 X 3,575,619 4/1971 Frank........................307/293

3,364,366 1/1968 Dryden..................328/185 X 3,397,323 8/1968 Hirsch...................307/293 X 3,596,113 7/1971 Seidler..................307/293 X

*Primary Examiner*—Stanley D. Miller, Jr.

*Attorney*—Donald P. Gillette

[57] ABSTRACT

A circuit utilizing a unijunction transistor or equivalent relaxation oscillator with a flip flop connected to the output thereof and having its output connected to control the time constant of the relaxation oscillator so that on alternate oscillations the time constant will be relatively low and on the remaining oscillations it will be relatively high to generate a signal having two time intervals in succession. A logic network controls driving circuits in response to the signals produced by the oscillator and the logic circuit divides the frequency of the oscillations to values suitable for timers such as interrupter timers for telephone systems.

13 Claims, 6 Drawing Figures

INVENTOR.
William P. Buyak
BY
Donald P. Gillette
Attorney

INVENTOR.
William P. Buyak
BY
Attorney

INVENTOR.
WILLIAM P. BUYAK
BY
ATTORNEY

INVENTOR.
WILLIAM P. BUYAK
BY
ATTORNEY

TIMING CIRCUIT WITH MULTIPLE TIME CONSTANTS AND SWITCHING MEANS TO CONNECT AND DISCONNECT SAID TIME CONSTANTS SELECTIVELY

FIELD OF THE INVENTION

This invention relates to the field of timing circuits using relaxation oscillators and particularly to circuits for generating oscillations having more than one time relationship.

BACKGROUND OF THE INVENTION

Telephone systems use devices known as interrupter timers. Heretofore, such timers have been electromechanical devices utilizing a constant speed motor and cam driven thereby to actuate mechanical contacts to produce electrical signal conditions for various purposes. For example, such interrupter timers are used to provide a signal to actuate the ringing circuit of a telephone so that the bell will ring one second and then will wait three seconds before ringing again. An additional timing function performed by interrupter timers is to provide a flash signal that can be applied to lights on a telephone to flash the lights on for one-half second and off for the next one-half second and then back on for the succeeding one-half second until the telephone is answered. Still another signal produced by interrupter timers is a wink signal which is also applied to the telephone lights to cause the lights to be off for 50 milliseconds and on for 450 milliseconds.

The electromechanical devices used for such timers are the result of careful engineering and have been refined so that they are as reliable and inexpensive as possible. Nevertheless, they do wear out and must be repaired or replaced from time to time.

Electronic timing circuits capable of performing all of the functions required of an interrupter timer can be produced by laborious assembly of a sufficiently large number of oscillators and logic circuits. However, these complex circuits are relatively expensive so that the resultant timer is not commercially competitive with most electromechanical interrupter timers.

It is one object of the present invention to provide a simplified electronic timing circuit using solid state elements. In particular, it is an object of the invention to provide a timing circuit for use in an interrupter timer in which solid state elements replace the electromechanical components used heretofore in interrupter timers of the prior art.

BRIEF DESCRIPTION OF THE INVENTION

The invention comprises a timing circuit utilizing a unijunction transistor or the equivalent to produce sawtooth relaxation oscillations. In one embodiment, the two base terminals of the unijunction transistor are connected in the usual way across a constant voltage source and a series RC circuit is also connected across a constant voltage which may be the same as the voltage across the unijunction transistor. The junction between the resistor and capacitor is connected to the emitter of the transistor as is customarily done in unijunction oscillators so that as voltage starts to build up across the capacitor, it finally reaches the point at which it produces a breakdown of the unijunction which discharges the capacitor and causes the voltage across it to start building up all over again. The repetition rate of relaxation oscillations produced by such a circuit is proportional to the product of the resistance and capacitance multiplied by a logarithmic function of the intrinsic standoff ratio of the unijunction transistor. A pulse output signal may be derived by causing the current through the unijunction transistor to flow through a resistance and produce a pulse voltage thereacross. This pulse voltage is connected to a flip-flop circuit to set it. The output of the flip-flop circuit is connected to an input circuit of a second transistor to turn that transistor on each time the flip-flop is set. Turning this transistor on effectively connects a second timing resistance in parallel with the first-mentioned timing resistance. The parallel timing resistances produce a lower equivalent resistance in series with the capacitor and this lower series resistance reduces the time constant of the circuit so that the next oscillation produced by the unijunction transistor has a shorter interval and, in effect, a higher repetition rate. At the end of this interval, the unijunction interrupter produces another pulse which turns the flip-flop off and, therefore, turns off the transistor connected thereto so that the additional parallel resistor is no longer effectively in the circuit. As a result, the duration of the next oscillation is longer than that of the preceding oscillation.

Additional flip-flop circuits may also be connected to the unijunction transistor to receive additional timing pulses and connect to the resistors in parallel with that of the basic timing circuit to produce different oscillation intervals.

In another embodiment, a programable unijunction transistor (PUT) may be used to achieve the same end result. In this case, the anode and cathode of the PUT are connected directly across the timing capacitor and the gate is connected to a voltage divider that sets the firing level. When the voltage between the anode and cathode exceeds that between the gate and cathode, the timing capacitor is short-circuited and discharges through the anode-cathode circuit and a short pulse is generated by a current flowing through the gate electrode. This short pulse may be used as the clock signal for the logic circuit to control the flip-flops which are essentially similar to those referred to in connection with the unijunction transistor.

DETAILED DESCRIPTION OF THE INVENTION

Figure 1:
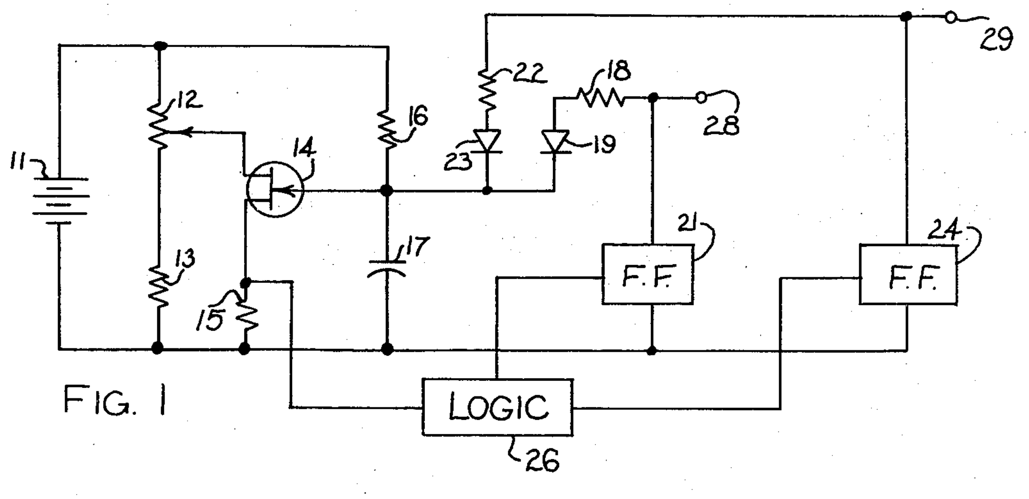
FIG. 1 shows a timing oscillator having multiple time constants and means for selectively connecting them into the circuit.

The circuit in FIG. 1 includes a constant voltage source, such as a battery, 11 with a voltage divider comprising a potentiometer 12 and, if desired, a resistor 13 connected in series therewith. A unijunction transistor 14 has one base terminal connected to the negative terminal of the battery through a resistor 15. The other base terminal is connected to the arm of the potentiometer 12. A timing circuit comprising a resistor 16 in series with a capacitor 17 is also connected across the battery 11 and a junction of the resistor 16 and the capacitor 17 is connected to the emitter of the unijunction transistor 14.

An additional resistor 18 is connected by way of a diode 19 to one end of the resistor 16. The resistor 18 is also connected to a flip-flop circuit 21 to be driven thereby between a high voltage state and a low voltage state. The high voltage state, in effect, places the right-hand end of the resistor 18 at approximately the same voltage as the positive terminal of the battery 11 and thus, because of the polarity of the diode 19, places the resistor 18 effectively in parallel with the resistor 16. As a result, the time constant of the RC circuit is reduced from the value that it has when only the resistor 16 is effectively in the circuit.

Other resistors may be added to produce still different time constants. For example, resistor 22 may be connected to the junction of the resistor 16 and the capacitor 17 by means of a diode 23. The other end of the resistor 22 is connected to a second flip-flop circuit 24 to be controlled thereby so that, under certain conditions, the resistor 22 is in parallel with the resistor 16, and perhaps with the resistor 18, and at other times is effectively out of the circuit.

The operation of the flip-flops 21 and 24 is controlled by a logic circuit 26 connected to the resistor 15 in one of the base terminals of the unijunction transistor 14. The output terminal of the flip-flop 21 is indicated by reference numeral 28, and the output terminal of the flip-flop circuit 24 is indicated by reference numeral 29. In addition to being part of the output circuits of the switching circuit that either connects the resistors 18 and 22 as part of the RC timing circuit or, in effect, removes them from the timing circuit, the output terminals 28 and 29 make rectangular wave signals available for other purposes, such as control of ringing circuits and other circuits in telephone systems. The diodes 19 and 23 allow current to flow in only one direction, and they help remove the resistors 19 and 22 from having any effect on the charging current to the capacitor 17 when the terminals 28 and 29 drop to a low voltage, such as the near-zero voltage that these terminals assume upon proper command from the logic circuit 26. It is assumed that the impedance of the diodes, when they are conductive, is much less than the resistance of the resistors 18 and 22.

Figure 2:
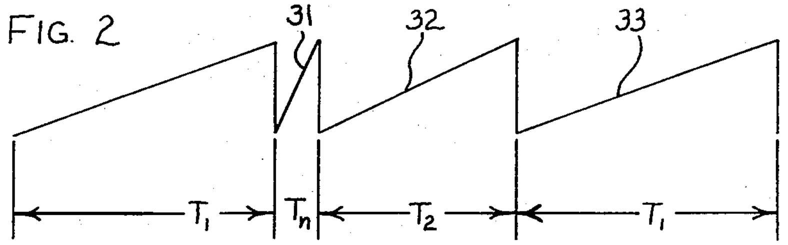
FIG. 2 is a waveform of a complete circle of oscillations generated in the circuit of FIG. 1.

One typical output voltage waveform that may be derived across the capacitor 17 is shown in FIG. 2. The waveform consists of three successive sawtooth voltage excursions. In each instance, the amplitude is the same but the sawtooth excursion 31 takes less time than does the sawtooth excursion 32 which, in turn, takes less time than the excursion 33. The latter is the excursion that corresponds to the condition in which only the resistor 16 is effectively in the timing circuit. The excursion 32 corresponds to the condition in which the resistor 18 is effectively in parallel with the resistor 16 and the time constant is, therefore, shorter than that which produces the excursion 33. The excursion 31 corresponds to the condition in which both the resistors 18 and 22 are in parallel with the resistor 16.

The period of oscillation of the circuit is:

$$T_n = R_T C \ln \frac{(1)}{(1-\eta)}$$

where $$R_T = \frac{1}{\frac{1}{R_{16}} + \frac{1}{R_{18}} + \frac{1}{R_{22}}}$$

and $\eta$ is the intrinsic stand-off ratio of the transistor 14, and C is the capacitance of the condenser 17.

Figure 3:
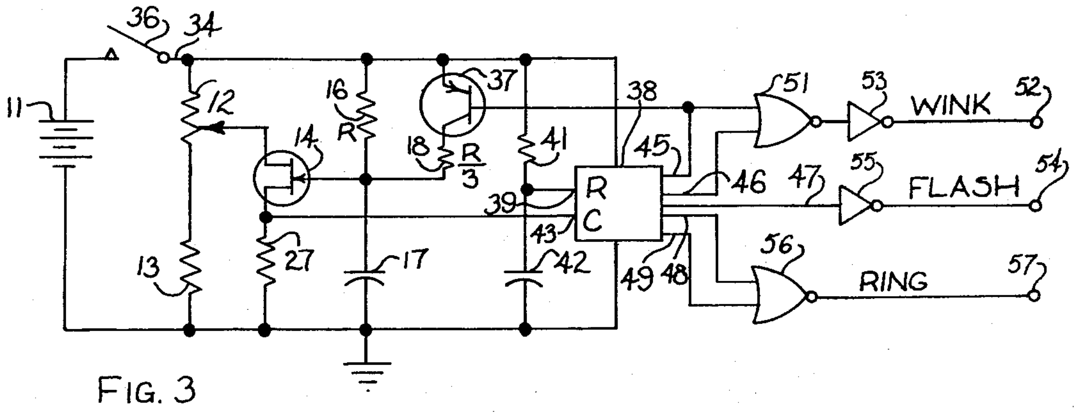
FIG. 3 is a schematic diagram of one embodiment of a timing circuit for an interrupter timer incorporating the oscillation generator of FIG. 1.

FIG. 3 is a circuit, partly in block form, of an interrupter timer using a modified embodiment of the oscillation generator shown in FIG. 1. Some of the components are similar to those in FIG. 1 and are given similar reference numerals.

Power for the circuit in FIG. 3 is supplied by the battery 11. A voltage divider comprising the potentiometer 12 and the resistor 13 is connected from a positive buss 34 to the negative common line, or ground. The negative terminal of the battery 11 is also connected to ground and the positive terminal is connected to the buss 34 by a switch 36. One base terminal of the unijunction transistor 14 is connected to the arm of the potentiometer and the other base terminal is connected to ground through the resistor 27. The timing circuit comprising the series-connected resistor 16 and capacitor 17 is also connected between the buss 34 and ground. The common terminal between the resistor 16 and the capacitor 17 is connected to the emitter of the unijunction transistor 14. The second resistor 18 is connected in series with the emitter-collector output circuit of a transistor 37 across the resistor 16.

The switching portion of the circuit includes a flip-flop divider circuit 38 that has a reset input terminal 39 connected to the junction between a resistor 41 and a capacitor 42. The resistor and capacitor are connected in series between the positive buss 34 and ground. A clock terminal 43 of the divider circuit 38 is connected to the junction between the resistor 27 and the second base terminal of the unijunction transistor 14. The divider circuit has five output terminals 45–49. The terminal 45 is connected to the base of the transistor 37 and to one input terminal of a NOR gate 51. The terminal 46 is also connected to the NOR gate 51. The output of the NOR gate is connected to a WINK terminal 52 via an inverter 53. The output terminal 47 of the divider circuit is connected to a FLASH terminal 54 via an inverter 55 and the output terminals 48 and 49 are connected to the two input terminals of another NOR gate 56. The output terminal of this NOR gate is connected directly to a RING terminal 57.

The operation of the circuit in FIG. 3 will be explained with reference to the waveforms in FIG. 4. When the switch 36 is closed, for example by operation of a relay from the central station, the voltage of the battery 11 is applied between the buss 34 and ground. A portion of this voltage is present at the arm of the potentiometer 12 and, therefore, is present at the upper base terminal of the unijunction transistor 14. However, the transistor is initially nonconductive so that no current flows through it and through the resistor 27.

The voltage from the battery 11 also energizes the flip-flop divider circuit 38. In order to be sure that the divider circuit starts with the proper voltage relationships at its output terminals, it is reset to an initial condition by a voltage applied to the reset terminal 39. This voltage is produced when the resistor 41 and the capacitor 42 are supplied from the positive buss 34. The output terminals 45–49 are capable of having either a high voltage or a low voltage.

Figure 4:
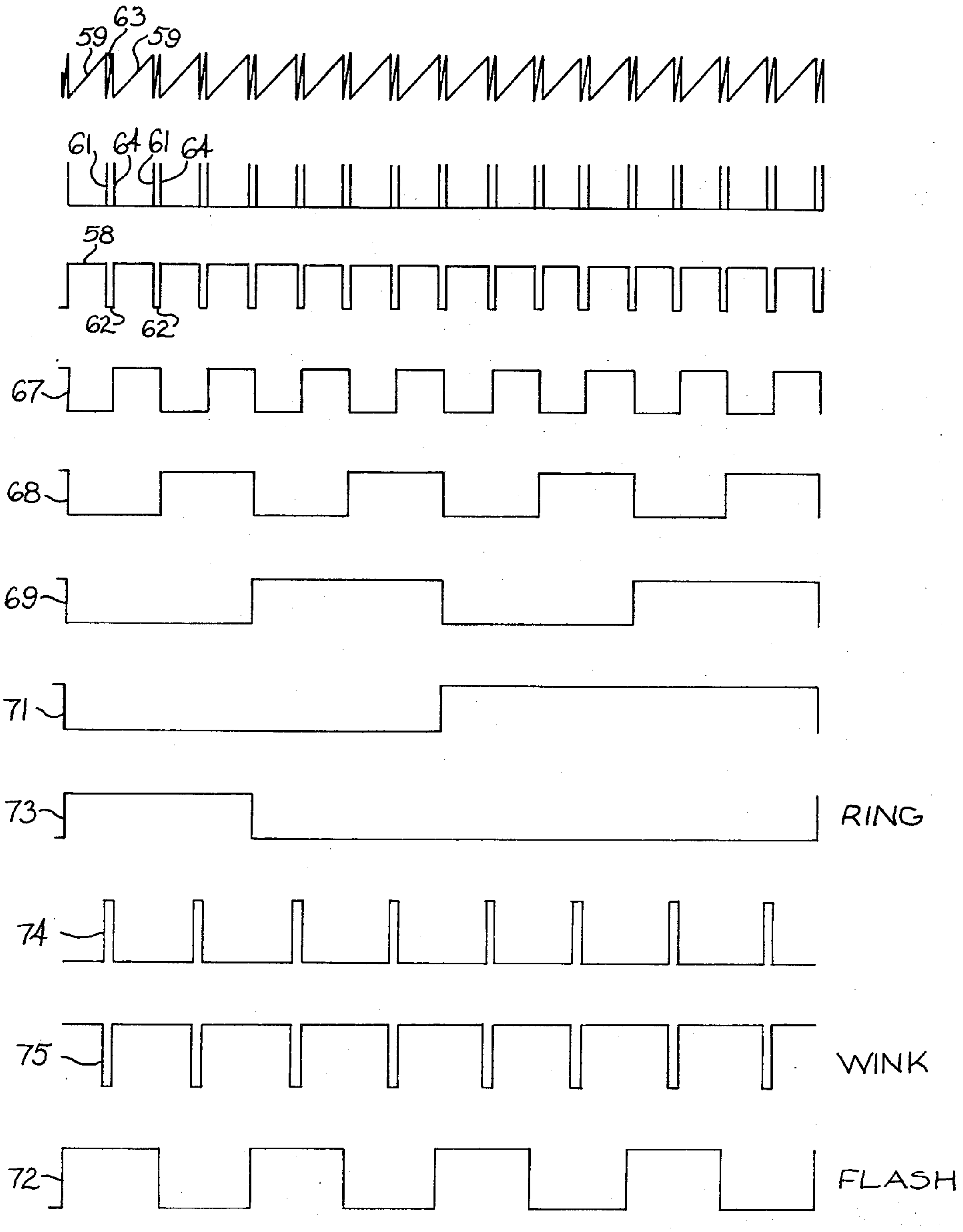
FIG. 4 is a series of waveform diagrams corresponding to the operation of the circuit in FIG. 3.

Initially, the voltage at the terminal 45 is high, as shown by reference numeral 58 in FIG. 4, so that the transistor 37 is nonconductive. Therefore, the voltage applied to the timing circuit causes charging current to flow only through the resistor 16 to charge the capacitor 17 exponentially to form a sawtooth voltage excursion 59, as shown in FIG. 4. The resistor 18 is effectively out of the circuit. For purposes of illustration, the resistance of the resistor 16 has arbitrarily been designated as R. This resistance is normally held to a fairly exact tolerance, for example ±1 percent. The capacitance of the capacitor 17 need not be at all accurate and may vary, for example, +60 percent and –20 percent, or even more, from its nominal value. This is permissible because the potentiometer 12 allows the base voltage of the unijunction transistor 14 to be set so that the transistor will become conductive at a predetermined time after the charging of the capacitor 17 starts.

When the voltage at the emitter of the transistor 14 reaches the conductive level, a current pulse flows through the resistor 27 and produces a voltage pulse 61 across it. This voltage pulse is applied to the clock input terminal 43 of the divider circuit and causes the output voltage at the terminal 45 to go low, to form the leading edge of a pulse 62. At the same time the conductivity of the unijunction transistor 14 discharges the capacitor 17 to a low enough level to make the unijunction transistor 14 no longer conductive. Voltage then starts to build up again expotentially across the capacitor 17 to form a second sawtooth wave 63. However, the change in the voltage at the output terminal 45 has made the transistor 37 conductive. It is assumed that the emitter-collector impedance of this transistor is much lower than the resistance of the resistor 18 so that the resistor 18 is effectively shunted directly across the resistor 16. The resistor 18 is also held to a fairly exact tolerance, for example ±1 percent, to keep the ratio of resistor 16 and resistor 18 as close as possible, for example ±2 percent. The resistance R/3 of the resistor 18 has arbitrarily been selected as one-third the resistance R of the resistor 16 and the combined resistance is, therefore, R/4. Thus, the time constant of the RC charging circuit during the sawtooth wave 63 is one-fourth the value of the initial charging rate during the sawtooth wave 59. This causes the voltage across the capacitor 17 to reach the level of conductivity of the unijunction transistor 14 in the second excursion 63 in one-fourth the time required originally. Upon reaching the level of conductivity, a second current pulse 64 passes through the unijunction transistor and is applied to the clock pulse terminal 43 of the divider circuit 38. This terminates the first pulse 62 and causes the output terminal 45 to return to the high state 58, as shown in FIG. 4, and turns off the transistor 37. As a result, the next buildup of voltage across the capacitor 17 will be at the slower rate to generate another voltage excursion 59 identical with the original excursion 59. This operation, which continues as long as the switch 36 remains closed, produces a series of alternately slow and fast sawtooth voltage excursions across the capacitor 17 and a series of unequally spaced clock pulses to be applied to the terminal 43 and a series of short negative rectangular pulses 62 at the output terminal 45.

Within the divider circuit 38 is a series of subcircuits which are standard in the art and which successively divide the pulse repetition rate by 2. The first such divider subcircuit has the terminal 45 as its output terminal. The second such divider subcircuit has the terminal 46 as its output terminal and produces a square wave 67 which goes alternately positive and negative upon the occurrence of the trailing edge of each of the pulses 62, i.e., upon the occurrence of each of the pulses 64.

Another divider subcircuit has an output terminal 47 and divides the repetition rate of the square wave 67 by 2 to produce a square wave 68. A still further division by 2 takes place in a subcircuit that has an output terminal 48 and produces a square wave 69 having a repetition rate one-half the rate of the pulses 68. The final divider subcircuit has an output terminal 49 and produces a square wave 71 having a repetition rate one-half the repetition rate of the pulses 69.

For use in an interrupter timer circuit the pulses must have certain specified repetition rates and durations. The basic duration is determined by the interval between the pulses 61 and 64 which is 0.05 seconds, and the values R and R/3 of resistance for the resistors 16 and 18, respectively, and the capacitance of the capacitor 17 are chosen with this value in mind. In addition, the value R of the resistance of the resistor 16 is chosen to make the interval between the pairs of pulses 61 and 64 equal to four times the time between the two pulses of the pair, viz. 0.2 second. The repetition rate of the pulses 62 is, therefore, four pulses/second. The repetition rate of the pulses 67 is half of this value, or two pulses/second. The frequency of this pulse signal is also divided by two to obtain the one pulse per second signal 68 which is the desired repetition rate for the flashing light used to denote an unanswered incoming call on a telephone set equipped with an indicator light. However, the pulse wave 68 must be inverted in order to flash the signal light at the proper times. Passing the signal 68 through the inverter 55 produces a correctly polarized signal 72, which is applied to the flash terminal 54.

The ringing circuit of a telephone system must provide a signal to ring the bell for one second and then wait for three seconds before ringing again. This continues until the phone is answered. In order to produce such a signal, the square wave 69 is applied to one input terminal of the NOR gate 56 in FIG. 3 and the pulse wave 71 is applied to the other input terminal of the same NOR gate. The output of the NOR gate 56 will drive the ring terminal 57 high only when both the square waves 69 and 71 are low. The resultant pulse output of the ring terminal 57 is indicated by the reference numeral 73 in FIG. 4.

The final pulse signal required for telephone use is a series of short-duration interruptions which actuate the indicator light to remind someone using the telephone that an incoming call has been answered but is being held. The repetition rate of these signals, which produce a winking effect of the indicator light, is 2 pulses/second and the duration of each pulse is 0.45 seconds. This waveform is obtained by applying to the NOR gate 51 in FIG. 3 the series of pulses 62 and the square wave 67. The NOR gate 51 is so arranged as to produce a positive-going output pulse 74 when the pulses 62 and 67 are both at their low values. The pulses 74 will, therefore, have a repetition rate one-half that of the pulses 62. The inverter 53 inverts these pulses to form a wink pulse signal 75 and applies this signal to the wink terminal 52.

Figure 5:
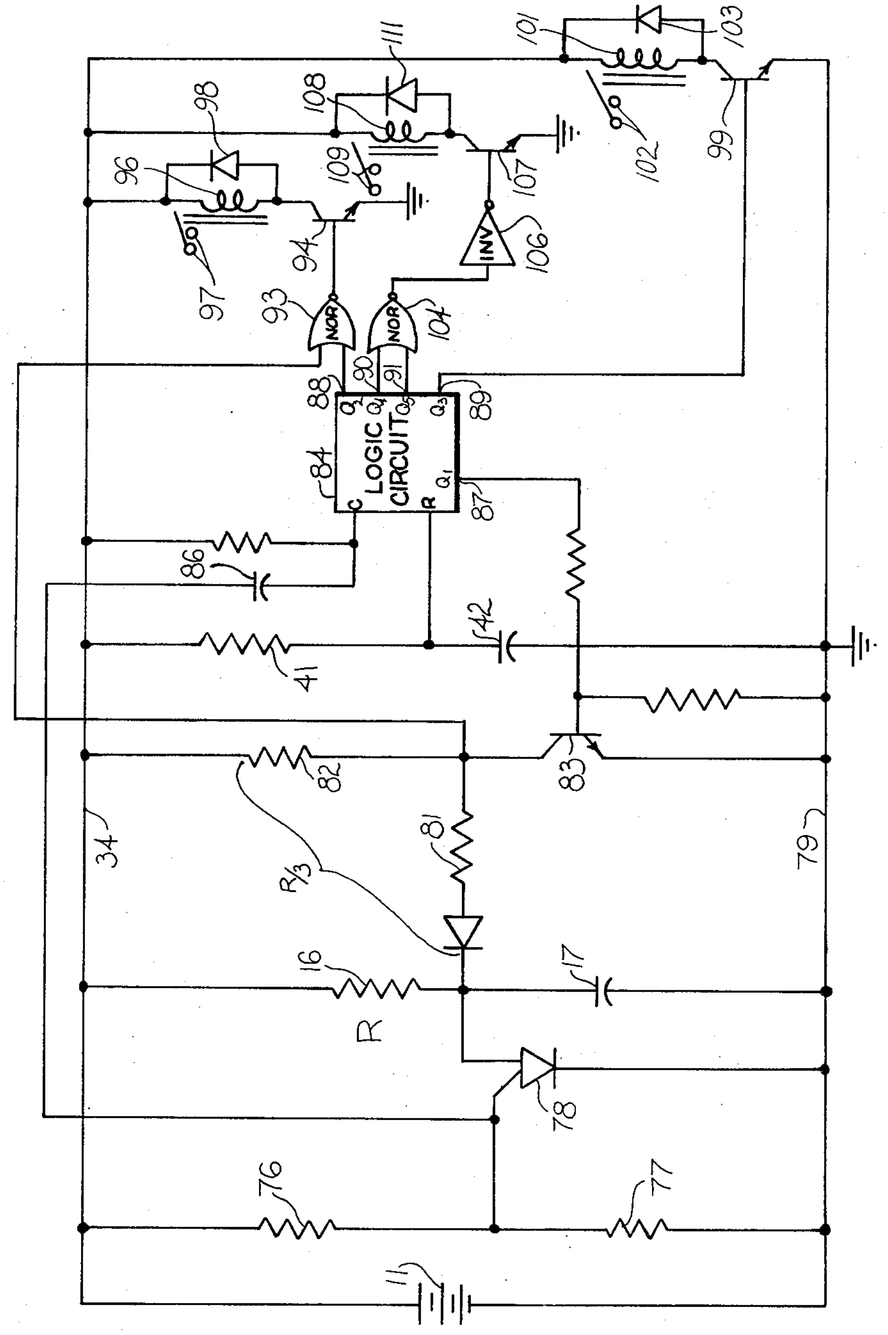
FIG. 5 is a schematic diagram of a second embodiment of a timing circuit for an interrupter timer.

FIG. 5 is a schematic diagram of a modified timer, but to the extent that it utilizes components that correspond to those in the circuits of FIGS. 1 and 3, they will be identified by similar reference numerals. The circuit in FIG. 5 receives operating power from any convenient source. The source shown is conventionally indicated as a battery 11 across which there is a voltage divider comprising a resistor 76 in series with another resistor 77. The gate of a programable unijunction transistor (PUT) 78 is directly connected to the junction between the resistors 76 and 77. The cathode of the PUT 78 is directly connected to the common lead 79 while the anode of the PUT is connected to the junction between the timing resistor 16 and the timing capacitor 17. The other terminal of the timing resistor 16 is connected to the common lead, or buss, 34 and the other terminal of the capacitor 17 is connected to the common lead 79. The resistance of the timing resistor 16 is identified as R and, in keeping with the relative time constants required, an additional time constant impedance is provided in the form of two resistors 81 and 82 connected in series with each other and with the diode 19 and in parallel with the resistor 16. The total resistance of the resistors 81 and 82 for the purpose of an interrupter timer is R/3, but the major part of that resistance is in the resistor 81. The junction between the resistors 81 and 82 is connected via the emitter-collector circuit of a transistor 83 to the common terminal 79.

A logic circuit 84 has its clock input terminal connected back via a capacitor 86 to the gate of the PUT 78. The reset terminal, which resets all of the output terminals of the circuit 84 to zero, is connected to the junction of the resistor 41 and the capacitor 42. The output terminals of the logic circuit 84 are identified by reference numerals 87 – 91. The terminal 87 is connected back to the base of the transistor 83. This terminal is also identified as the $Q_1$ terminal. The terminal 88, which is also referred to as the $Q_2$ terminal, is connected to one input terminal of a NOR gate 93. The other terminal of the NOR gate is connected to the collector of the transistor 83 so that the two signals supplied to the NOR gate are $\overline{Q_1}$ and $Q_2$. The output of the NOR gate 93 is connected to a transistor 94 that actuates a relay 96 to control the wink light of a telephone system. This relay has terminals which are conventionally indicated by reference numeral 97 and which are closed for a period of 450 ms and open for a period of 50 ms, respectively. A diode 98 is connected across the coil of the relay 96 to control voltage pulses generated across the coil.

The terminal 89, from which a signal $Q_3$ is derived, is connected to the base of a transistor 99 that controls a relay 101. This relay is connected through its terminal 102 to the flashing circuit of a telephone set to flash the signal light on and off to indicate an incoming call. The coil of the relay 101 has a diode 103 connected across it to limit transient voltages.

The terminals 90 and 91 to which are applied signals $Q_4$ and $Q_5$, respectively, are connected to a NOR gate 104, the output of which is transmitted through an inverter 106 to the base of a transistor 107. The latter transistor controls a relay 108 having terminals 109 connected to the ringing circuit of a telephone set. A transient voltage limiting diode 111 is connected across the coil of the relay 108. The combined effect of the NOR gate 104 and the inverter 106, in terms of logic, is equivalent to an OR circuit.

Figure 6:
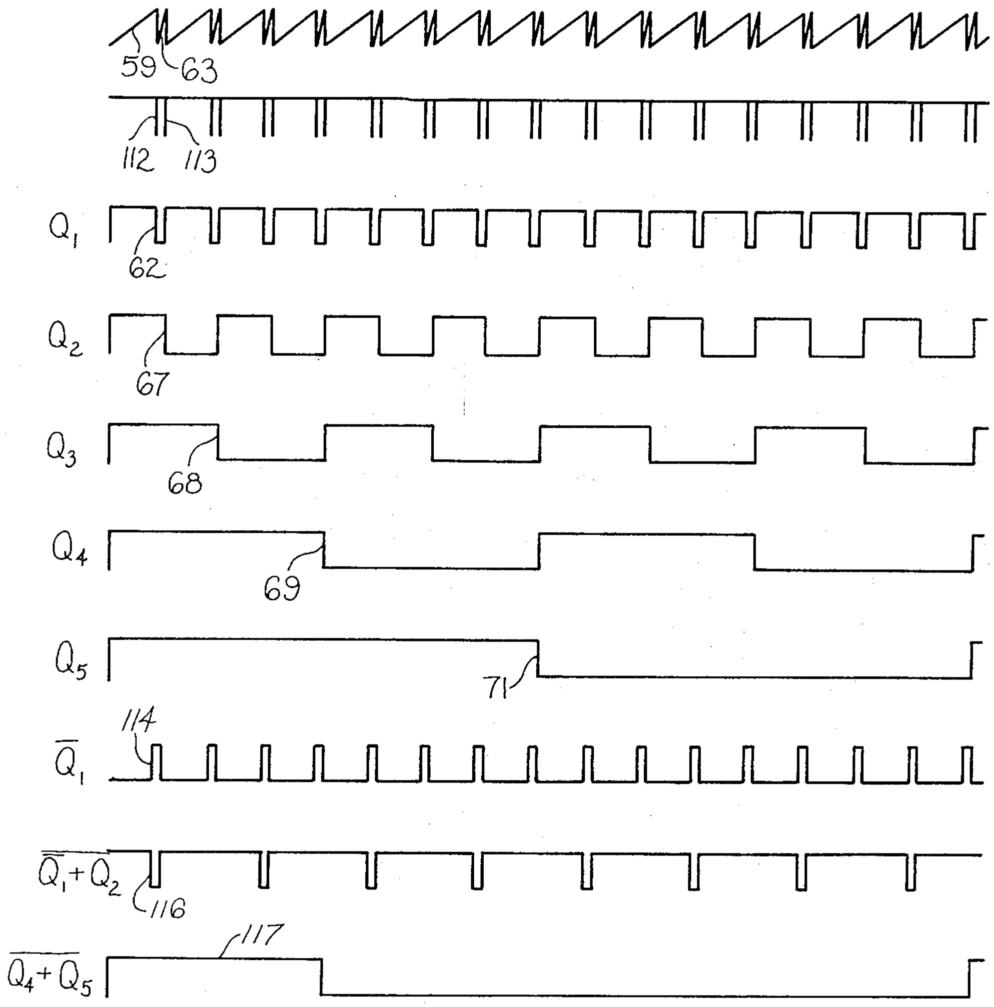
FIG. 6 is a series of waveform diagrams corresponding to the operation of the circuit in FIG. 5.

The operation of the circuit in FIG. 5 will be described with reference to voltage waveforms shown in FIG. 6. Normally, the voltage at the gate of the PUT 78 starts off at a fixed level determined by the voltage division ratio of the resistors 76 and 77. The voltage across the anode and cathode of the PUT 78 starts at or near zero and builds up expotentially in accordance with the voltage build-up across the capacitor 17 at a rate determined by the effective resistance in series therewith. Initially, only the resistor 16 is effectively in series because the logic of the circuit 84 is such that all of the output terminals 87 – 91 are reset to their high voltage level. The logic circuit 84 has been selected so that the high voltage level corresponds to logic 0 and the low voltage to logic 1. The logic 0 at the terminal 87 renders the transistor 83 conductive and effectively short-circuits the junction between the resistors 81 and 82 to the common terminal 79. The diode 19 is polarized so that, in this condition, current will not flow through the resistor 81 to affect the charge on the capacitor 17. As a result, the charge on the capacitor 17 builds up expotentially as shown in the waveform 59 until a voltage level is reached across the capacitor 17 that will make the anode of the PUT positive with respect to the cathode and the gate and will cause the PUT to conduct and discharge the capacitor. At the same time, a very short pulse 112 flows through the gate of the PUT and is conveyed by the capacitor 86 to the clock terminal of the logic circuit 84. This reverses the polarity of the terminal 81 to the logic 1 state and drops the voltage applied to the base of the transistor 83 and makes that transistor non-conductive. This is the beginning of a pulse 62 of the $Q_1$ signal in FIG. 6.

When the transistor 83 becomes non-conductive, the resistors 81 and 82 become, in effect, a single resistor in parallel with the resistor 16. The total resistance of this parallel connection is selected to be R/4 and as the capacitor 17 changes during its next interval of operation, it does so at a rate four times as great as the initial rate. This produces a short sawtooth wave 63. At the same predetermined level as before, the voltage across the capacitor places the PUT 78 in condition to create another short pulse 113 by conductivity from the gate to the cathode of the PUT. This pulse 113 is connected to the logic circuit 84 and again reverses the pulse at the terminal 87. In addition, internally within the circuit 84, a frequency divider operates to change the voltage level of the terminal 88 from logic 0 (the high voltage level) to logic 1 (the low voltage level) to form the first pulse 67 in the wave $Q_2$. Thus while the wave $Q_1$ changes its polarity upon the occurrence of each pulse 112 and 113, the wave $Q_2$ changes polarity only upon the occurrence of the pulses 113 and is not effected by the pulses 112.

Other divider circuits of known type within the logic circuit 84 effect frequency division of the $Q_2$ signal to produce the $Q_3$ signal which has pulses 68, the $Q_4$ signal which has pulses 69, and the $Q_5$ signal which has pulses 71.

The $Q_3$ signal is a one second square wave which is high half the time and low the other half. It is therefore suitable both in timing and in polarity for controlling the flash circuit of the system and is applied directly from the output terminal 89 to the base of the transistor 99 to turn the latter on each time the $Q_3$ signal goes high. When this happens the relay 101 is energized and closes the flash contacts 102.

The wink signal is generated by the use of the $Q_1$ signal and the $Q_2$ signal. However, the $Q_1$ signal does not have the correct polarity and the polarity must be inverted. This is done by feeding the $Q_1$ signal from the output terminal 87 through the transistor 83, which inverts the signal and applies it as a $\overline{Q_1}$ signal to one of the input terminals of the NOR gate 93. This $\overline{Q_1}$ signal is illustrated in FIG. 6 by reference numeral 114. It has a repetition rate of four pulses per second, which is twice as great as is needed. Therefore the other signal applied to the NOR gate 93 is the $Q_2$ signal derived from the output terminal 88. The combination of these two signals is inverted and applied to the base of the transistor as a signal $\overline{Q_1 + Q_2}$ and identified in FIG. 6 by reference numeral 116. This signal has a high period of 450 ms and a low period of 50 ms, which is appropriate for the wink circuit of the system and causes the wink contacts 97 to be closed when the signal 116 is high and open when the signal 116 is low.

The final signal is the ring signal, which requires a pulse that is high for one second and low for the next three seconds and then returns to the high state again. This signal is derived from the $Q_4$ and $Q_5$ signal at the output terminals 90 and 91. These terminals are applied to the NOR gate 104 and their output is directed through the inverter 106, which produces a signal $\overline{Q_4 + Q_5}$ and identified in FIG. 6 as signal 117. This signal, applied to the base of the transistor 107, closes the terminals 109 for the appropriate one second out of every four.

What is claimed is:

1. An oscillation generator comprising:
   - A. a unijunction transistor having first and second base terminals and an emitter terminal;
   - B. a timing circuit comprising:
     1. a first resistor, and
     2. a capacitor connected in series with said resistor to receive charging current therethrough, said capacitor also being connected in series between said emitter and said first base terminal, and said resistor also being connected in series between said emitter and said second base terminal;
   - C. a second resistor; and
   - D. an electronic switching circuit connected to said unijunction transistor to be actuated by current pulses through said transistor, said switching circuit comprising an output circuit switchable between first and second states by successive pulses from said transistor and connected to said second resistor to connect said second resistor effectively in series with said capacitor to supply additional charging current thereto when said switching circuit is in its first state and effectively to remove said second resistor from said capacitor when said switching circuit is in its second state.

2. The generator of claim 1 in which said output circuit comprises a transistor connected in series with said second resistor to form a second series circuit in parallel with said first resistor.

3. The generator of claim 1 in which said switching circuit comprises a terminal switchable between a constant high voltage and a low voltage and said second resistor is connected in series between said terminal and the common junction of said first resistor and said capacitor.

4. The generator of claim 3 comprising, in addition: a diode connected in series with said second resistor to allow current to flow through said second resistor only to charge said capacitor in the same sense as current through said first resistor.

5. The oscillation generator of claim 1 comprising, in addition: a variable voltage source connected to one of said base terminals to adjust the voltage at which said unijunction transistor becomes conductive as said capacitor charges up.

6. The oscillation generator of claim 1 in which said first and second resistors are high precision resistors having resistance values within approximately 1% of a nominal value.

7. The oscillation generator of claim 6 comprising, in addition: a voltage divider comprising a potentiometer, one of said base terminals being connected to the arm of said potentiometer to control the voltage at which said unijunction transistor becomes conductive as said capacitor charges up, said capacitor being of relatively low precision and having a capacitance that may differ more than 20 percent from a nominal value.

8. The oscillation generator of claim 1 comprising, in addition: a load resistor in series with said second base terminal, said switching circuit being connected to the junction between said load resistor and said second base terminal to be actuated by current pulses through said transistor and said load resistor.

9. The oscillation generator of claim 1 comprising, in addition:
   - A. terminals for connection to a source of direct voltage, said timing circuit being connected across said terminals;
   - B. a second series circuit connected across said terminals and comprising a second capacitor and a third resistor, said switching circuit comprising a reset terminal connected to the junction of said second capacitor and said third resistor to receive a reset signal when said terminals are connected to a source of direct voltage.

10. The oscillation generator of claim 9 in which said output circuit comprises a first output terminal to connect said second resistor effectively in series with said capacitor when said first output terminal is in said first state, said first output terminal being switched back and forth between said first state and said second state at a predetermined pulse repetition rate, and a second output terminal switchable between first and second states at a repetition rate one-half the repetition rate of said predetermined repetition rate, said oscillation generator comprising, in addition: a NOR gate having a first input terminal connected to said first output terminal and a second input terminal connected to said second output terminal of said switching circuit, and a driver circuit connected to the output of said NOR gate.

11. The oscillation generator of claim 10 comprising, in addition:

A. a third output terminal on said output circuit to provide a third series of pulses having a repetition rate one-half the repetition rate of pulses at said second output terminal; and B. a second driver circuit connected to said third output terminal.

12. The oscillation generator of claim 11 comprising, in addition:

A. a fourth output terminal providing pulses having a repetition rate one-half the repetition rate of pulses at said third output terminal;

B. a fifth output terminal providing pulses having a repetition rate one-half the repetition rate of pulses at said fourth output terminal;

C. a second NOR gate having a first input terminal connected to said fourth output terminal and a second input terminal connected to said fifth output terminal; and D. a third driver circuit connected to the output of said second NOR gate.

13. An oscillation generator comprising:

A. a solid state device comprising first, second, and third electrodes;

B. a timing circuit comprising:

1. a first resistor, and
2. a capacitor connected in series with said resistor to receive charging current therethrough at a predetermined rate, said capacitor also being connected in series between said first and second electrodes;

C. means to connect said third electrode to a source of potential different from the potential of said first electrode and of a polarity to permit conduction between said first and third electrodes when said second electrode reaches a predetermined potential;

D. means connected to said first resistor to supply charge to said capacitor at said predetermined rate to increase the voltage thereacross in the proper polarity to cause said second electrode to reach said predetermined potential;

E. a second resistor; and

F. an electronic switching circuit connected to said solid state device to be actuated in response to current pulses through said solid state device and comprising an output circuit switchable between first and second states by successive pulses through said solid state device and connected to said second resistor to supply current therethrough to charge said capacitor at a rate higher than said predetermined rate when said output circuit is in its first state and at said predetermined rate when said output circuit is in its second state in which said second resistor is effectively disconnected from said capacitor.

* * * * *